US007587178B2

(12) United States Patent
Marquardt

(10) Patent No.: US 7,587,178 B2
(45) Date of Patent: *Sep. 8, 2009

(54) SIGNALING DEVICE

(75) Inventor: Juergen Marquardt, Rietheim-Weilheim (DE)

(73) Assignee: WERMA Signaltechnik GmbH & Co. KG, Rietheim-Weilheim (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/077,027

(22) Filed: Mar. 11, 2005

(65) Prior Publication Data

US 2005/0200460 A1 Sep. 15, 2005

(30) Foreign Application Priority Data

Mar. 11, 2004 (DE) ...................... 10 2004 012 309

(51) Int. Cl.
*H04B 1/38* (2006.01)

(52) U.S. Cl. .................. 455/90.3; 455/41.2; 455/404.1; 455/418; 455/426.2; 455/556.1; 340/5.3; 340/5.31; 340/679; 700/108; 700/109; 700/110; 370/328; 370/338

(58) Field of Classification Search .................. 340/5.3, 340/5.31, 679; 700/108, 109, 110; 455/41.2, 455/426.2, 90.3, 404.1, 418, 41.3, 556.1
See application file for complete search history.

(56) References Cited

U.S. PATENT DOCUMENTS

| | | | | | |
|---|---|---|---|---|---|
| 3,868,671 | A * | 2/1975 | Maguire et al. | ......... | 340/323 R |
| 4,931,766 | A * | 6/1990 | Bernard et al. | .............. | 340/332 |
| 5,838,226 | A * | 11/1998 | Houggy et al. | ......... | 340/310.11 |
| 5,952,915 | A * | 9/1999 | Marquardt et al. | .......... | 340/332 |
| 5,963,126 | A * | 10/1999 | Karlin et al. | ................ | 340/321 |
| 6,301,514 | B1 * | 10/2001 | Canada et al. | .............. | 700/108 |
| 6,466,134 | B1 * | 10/2002 | Ahearn | ....................... | 340/683 |
| 6,646,564 | B1 * | 11/2003 | Azieres et al. | .............. | 340/679 |
| 6,697,466 | B2 * | 2/2004 | Howard et al. | ........... | 379/93.37 |
| 6,814,610 | B2 * | 11/2004 | Kurose et al. | ............... | 439/507 |
| 7,058,542 | B2 * | 6/2006 | Hauhia et al. | ............... | 702/183 |
| 7,233,745 | B2 * | 6/2007 | Loechner | .................... | 398/128 |
| 2004/0107766 | A1 * | 6/2004 | Bonne et al. | ............... | 73/25.05 |
| 2005/0007249 | A1 * | 1/2005 | Eryurek et al. | .............. | 340/511 |

FOREIGN PATENT DOCUMENTS

| | | | | |
|---|---|---|---|---|
| DE | DE 80 18 058.1 | | | 10/1983 |
| DE | DE 42 19 894 | A1 | | 12/1993 |
| DE | 195 13 983 | A1 | | 10/1995 |
| DE | DE 296 08 058 | U1 | | 7/1996 |
| DE | DE 297 11 886 | U1 | | 10/1997 |
| DE | WO-9740310 | | * | 10/1997 |
| DE | DE 100 58 695 | | | 5/2002 |
| DE | DE 100 58 695 | A1 | | 5/2002 |
| EP | 0 913 625 | A2 | | 5/1999 |
| EP | 1 239 214 | A2 | | 9/2002 |
| WO | WO 02/48 808 | A2 | | 12/2001 |

* cited by examiner

*Primary Examiner*—Stephen M D'Agosta
(74) *Attorney, Agent, or Firm*—Breneman & Georges

(57) ABSTRACT

A signaling device, in particular a signal pillar 1, is provided which is able to generate signals even outside the range of the usual optical and acoustic signals, and flexibly create them as needed with little additional effort. This object is achieved by providing a wireless transmitting unit (8) for transferring data to a receiver in addition to the signal elements (2, 3, 4) for generating optical and/or acoustic signals, wherein the transmitting unit (8) is arranged in an exchangeable module.

19 Claims, 1 Drawing Sheet

SIGNALING DEVICE

BACKGROUND OF THE INVENTION (1) Field of the Invention

The invention relates to a signaling device, in particular to a signal pillar for indicating at least one operating state of industrial equipment, such as a machine, plant, vehicle or the like with an optical and/or acoustic signal element wherein a transmitting unit is additionally provided with a transmitter for the wireless data transfer to a receiver. More particularly the invention pertains to a signal pillar having a transmitting unit of a signaling device arranged in an exchangeable module.

(2) Description of Related Art Including Information Disclosed Under 37 C.F.R. 1.97 and 1.98

Signaling devices, in particular signal pillars, are in widespread use for indicating the operating states of industrial equipment, such as machines, plants or vehicles. They serve first and foremost to indicate malfunctions of such machines or plants, so that the operating personnel can detect and eliminate them. In addition, these signaling devices can also signal operating states that pose a danger to the environment or persons in the environment.

In order to maximize the capacity of machines or plants, they are usually operated continuously. At many production facilities, such machines are essentially fully automated, so that only a handful of operators and monitors are provided. Since it will here inevitably not be possible to monitor individual machines or plants at all times, there might well be undetected malfunctions, accompanied by associated negative side effects, such as an operational failure, or even hazardous situations.

The market offers machines in which the controller (e.g., an SPS controller) is hardwired to a communications network, in order to transfer information to an operator or maintenance technician. The disadvantage to this model is that the machine controller and communications network must be hardwired at the machine location, and corresponding efforts must also be made to adjust the entire machine controller.

Publication DE 100 58 695 discloses a signal pillar having a radio module that is connected to a receiver. In this signal pillar, the radio module is always allocated to a specific signal pillar, or at least to a specific signal element. In many applications, however, remote monitoring is only required during certain operating phases, while a conventional signal pillar is sufficient in other operating phases. When using signal pillars according to prior art, one or more radio modules are also provided in the operating phases where they are not required. As a result, a corresponding additional effort is required.

BRIEF SUMMARY OF THE INVENTION

Therefore, an object of the invention is to provide a signaling device that is also able to generate the corresponding signals outside the range of the usual optical or acoustic signals. In this case it is possible to flexibly provide a signal pillar according to the invention with a radio module if needed at low cost.

This object is achieved in a signaling device with an optical and/or acoustic signal display by additionally providing a wireless transmitting unit for sending data to a receiver, wherein the transmitting unit of the signaling device is arranged in an exchangeable module.

The invention here makes use of the fact that the corresponding machines, plants, vehicles or the like already have an interface to the signaling device, since the signaling device must generate an optical or acoustic signal in the usual manner to indicate the desired operating state. In addition, such a conventional signaling device already incorporates a controller to generate these signals. The invention uses this fact to reach a mobile receiver via the transmitter which is additionally present for wireless data transfer, wherein the mobile receiver can be carried by operating or monitoring personnel located farther away, possibly even outside the plant premises. No modifications whatsoever are required to the industrial equipment to be monitored.

According to the invention, the transmitter of the signaling device is also designed as an exchangeable module. As a result, only specific machines or plants need be equipped with a transmitter according to the invention at any one time, tangibly reducing investment costs. The existing signal pillars or their accessory signal elements can here be used without being replaced in each operating mode, i.e., with or without radio module.

An exchangeable module can be built into or disassembled from an existing signal pillar especially easily and quickly if its connection elements at least partially match the mechanical and/or electrical connection elements of individual signal elements in a signal pillar. Modular signal pillars are already available on the market in various models. The individual signal elements are here mechanically connected, for example, by means of a bayonet seal, wherein the electrical contacts are closed or opened internally, for example, as spring contacts, as the bayonet seal closes or opens. A radio module provided with corresponding connection elements can hence be integrated just as easily and quickly into a signal pillar as the individual signal elements comprising the various segments of the signal pillar.

In an advantageous further development of the invention, the transmitter and/or the receiver is designed to use a public communications network. This eliminates the need for separately establishing a data transmission path.

Further, an additional modem can be provided in the data transmission path between the transmitter and receiver. Such a modem can serve as an interface in a public communications network. The communications network can here be designed as a wireless radio network and/or as a hardwired cable network. Only the wireless connection between the transmitter of the signaling device and the transfer unit in the transmission path between the transmitter and receiver is important in this exemplary embodiment. Further developing the above embodiment involves the operation of several transmitters of one or more signaling devices with the exact same transfer unit. Digital data transmission channels make it possible to realize such a configuration without difficulty, wherein the expense of a plurality of transfer units is no longer required.

Machines or plants will oftentimes briefly require especially intensive monitoring. For example, when setting up a new production process, or as a machine or plant approaches a maintenance or service interval after a corresponding period of operation or number of worn parts, the signaling device of such a machine or plant, or also of a vehicle or the like, can be specially monitored by fitting the signaling device with such an exchangeable module having the transmitter according to the invention. As soon as the exchangeable module has been installed, the corresponding industrial equipment can be monitored accordingly, i.e., signals can even be delivered through the night, even from outside the plant premises, etc.

In a special embodiment of the invention, a land line telephone, a mobile radiotelephone, a radio device and/or an Internet user is provided as the receiver. All such communication devices are basically suitable for realizing the invention. If the receiver is designed as a radio device or mobile telephone, the corresponding transmitter in the signaling device can also be designed as a radio device or mobile telephone or radio modem. Communication between the transmitter in the signaling device and receiver for the signal addressee, e.g., an operator, here takes place directly via the corresponding wireless transmission path.

In the embodiment making use of a land line telephone network or the receiver configured as an Internet user, the transmitter can here contact the receiver by means of a transfer unit described above. For example, a wireless connection can be provided between the transmitter and a computer connected to the Internet by wireless or cable. The transmitter can also be designed as a mobile telephone for communication with a base station, which is connected to the land line telephone.

There are here advantages to using conventional standard components. For example, the transmitter can be designed as a so-called DECT telephone unit, wherein the corresponding base station for the land line telephone network must be provided within the range of this DECT mobile segment.

Another embodiment would involve the use of so-called Blue Tooth units, which can be used, for example, to set up a wireless connection from a transmitter according to the invention to a computer, e.g., to effect an Internet transmission.

In addition, the signaling device according to the invention can also be provided with a transmitting unit that can relay its signals using several transmission modes. For example, combining a mobile telephone transmitter with a radio device and a Blue Tooth module would be readily conceivable in order to make various transmission channels in a transmitter unit available.

The type of signals to be transmitted can here be configured in a variety of ways, depending on the application. For example, voice message transmission can also be provided, along with text message transmission, e.g., so-called SMS, etc. However, the transmission of simpler, e.g., symbolic warning or information signals, is also readily conceivable.

In particular during digital signal transmission, it is also readily conceivable to report various operating states of the industrial equipment provided with the signaling device according to the invention. This relates not just to disrupted states, as information can also be displayed or announced beforehand about the type of operations or maintenance steps to be implemented, e.g., refilling cartridges, performing service work, etc., so that the appropriate person can be summoned in a timely manner, in particular before a failure has occurred.

In certain applications, it can make sense to routinely report a normal, undisturbed operating state.

In addition, a signaling device according to the invention is preferably designed to simultaneously incorporate a receiver. This embodiment permits interactive data transfer, i.e., an appropriate operator or monitor can send information to the signaling device or acquire it there.

A signaling device according to the invention can also be designed in such a way that the signal addressee can be freely entered as desired. The storage of several signal addresses is also conceivable here as a hedge against emergency situations in which the desired operator or maintenance technician cannot be reached. If several people have to be informed, this can also be done with a signaling device according to the invention, either simultaneously or consecutively.

Depending on the type of data transmission channel, the transmitter according to the invention radiates a certain amount of electromagnetic power. This energy can be sufficient to itself trigger failures in the signaling device. For example, low levels of radiated power measuring 5 Watts or the equivalent can acutely disrupt LED's, which generate a light signal. For this reason, the sensitive components, e.g., the sensor (LED, piezo buzzer, etc.) or electronic control units are shielded accordingly against the antenna of the transmitter according to the invention in a corresponding embodiment of the invention, so that disturbance fields, or at least excessively large disturbance fields, cannot form in the area of the corresponding sensors and/or control electronics.

In another embodiment, the antenna is additionally secured to the outside of the signaling device to ensure a greater distance and better ability to shield the corresponding components of the signaling device.

BRIEF DESCRIPTION OF THE SEVERAL VIEWS OF THE DRAWINGS

An exemplary embodiment of the invention is shown in the drawing, and will be explained in further detail below based on the FIGURE.

The single FIGURE (FIG. 1) shows a sectional, side view of a signaling device according to the invention with a radio module according to the invention.

DETAILED DESCRIPTION OF THE INVENTION INCLUDING BEST MODE

Figure 1:
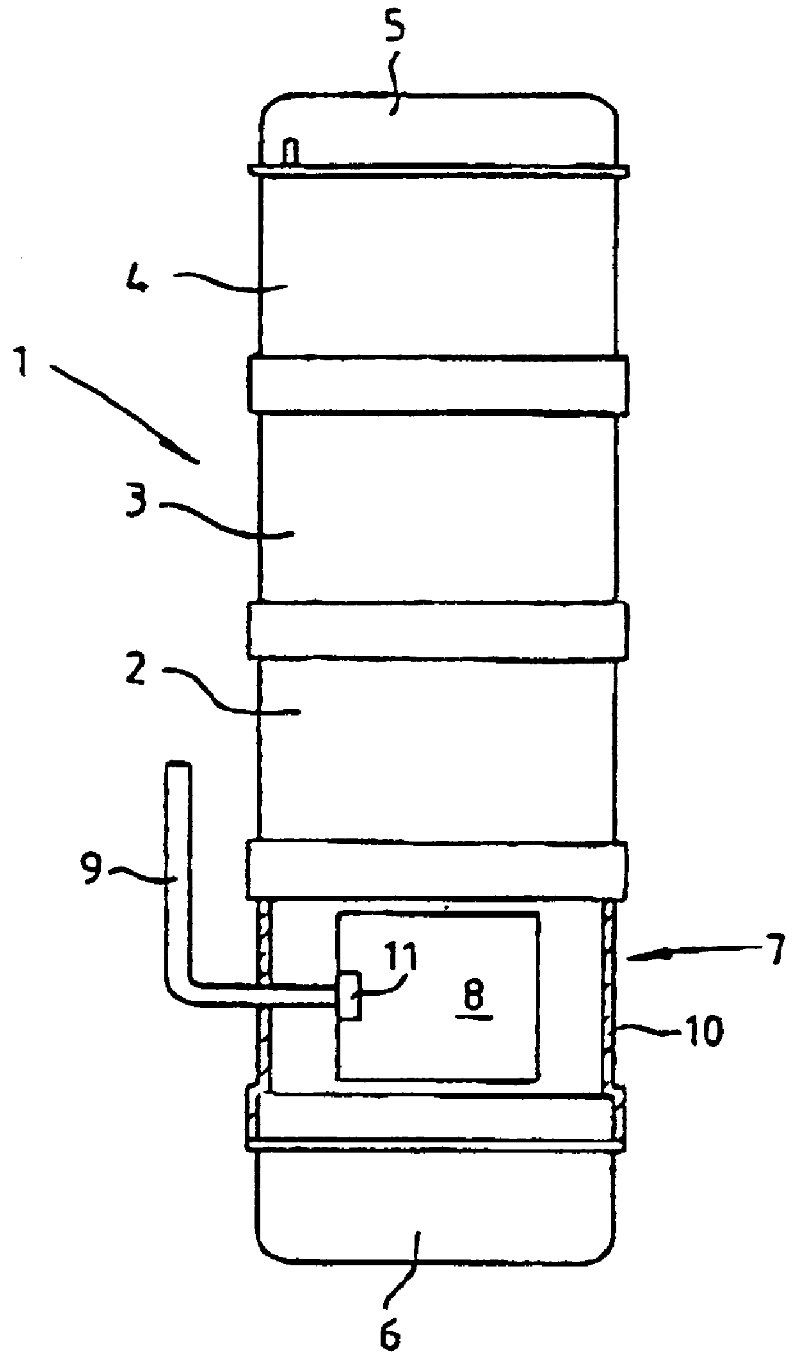

The signaling device according to the FIGURE is designed as a signal pillar 1, which integrates several optical and/or acoustic signal elements 2, 3, 4. These individual signal elements can be provided, for example, for a modular structure with corresponding sealing mechanisms, e.g., a bayonet seal, and the corresponding contact elements, to establish the electrical contacts during assembly.

The signal pillar 1 is sealed with a cover 5, which can also incorporate a signal element, e.g., a piezo buzzer or the like, if needed.

A receptacle 6 is provide as a connection element, i.e., it can be connected with the corresponding machine, plant or vehicle by means of connection elements not shown in greater detail, such as cable sets, mounts or the like.

According to the invention, a radio element 7 is now arranged between the receptacle 6 and first adjacent signal element 2. The radio element 7 incorporates a transmitting unit in the form of a radio module 8, whose antenna 9 is routed outside the housing 10 of the radio element 7, passing through said housing 10 to this end.

As illustrated in the FIGURE, the radio module 7 or its housing 10 is mounted on the signal elements 2, 3, 4. Accordingly, the way the radio element 7 is mechanically connected mirrors the connection between the individual signal elements 2, 3, 4. As a result, the signal pillar 1 can be put together very quickly and easily. In particular, the radio element 7 can be installed and disassembled again for another use by simply undoing the corresponding seal, e.g., a bayonet seal between the cover 6 and signaling element 2.

In a particularly advantageous embodiment of the invention, the electrical connection sites are here designed in such a way as to automatically open or close when the mechanical seals are opened or closed.

In addition to electronic components not shown in greater detail, the radio module 8 consists of a transmitter 11, which is connected with the antenna 9.

The arrangement of the radio element 7 between the receptacle 6 and lowermost signal element 2 involves a certain function. All control signals for the overlying signal elements 2, 3, 4 can be acquired from the radio module 8 at this location. To this end, the radio module 8 can be connected with control electronics in the receptacle 6 (not shown in any greater detail).

Further above and between the individual signal elements 2, 3, 4, only the control signals for the immediately overlying signal elements can be reached since all control signals are not usually relayed through the entire signal pillar 1 in order to reduce the expense.

The radio module 8 can use the control signals that the machine controller already generates for the signal pillar 1 or the control electronics of the signal pillar 1 (not shown in greater detail) to generate an appropriate radio signal and emit it via the transmitter 11. The machine controller does not have to be matched to the configuration of the signal pillar 1 according to the invention.

A receiver not shown in any greater detail can be used to receive the signals emitted from the radio module 8, and make them available to a signal addressee, e.g., an operator or maintenance technician.

As already mentioned above, the radio module 8 can here be designed as a so-called GSM radio module, Blue Tooth module, DECT radio modem, etc.

The radio element 7 is designed as an exchangeable module, just like the other elements of the signal pillar 1, i.e., the receptacle 6, the signal elements 2, 3, 4 and the cover 5. Therefore, it can be removed from the signal pillar taking simple steps, e.g., by detaching a bayonet seal between the signal element 2 on the one hand and the receptacle 6 on the other, and can be integrated into an appropriate signal pillar at another location. The remaining components of the signal pillar 1, i.e., the unit comprised of the signal elements 2, 3, 4 and accommodated on the cover 5, can subsequently be easily placed back onto the receptacle 6, secured and contacted, and operated as a conventional signal pillar.

REFERENCE LIST

1 Signal pillar
2 Signal element
3 Signal element
4 Signal element
5 Cover
6 Receptacle
7 Radio element
8 Radio module
9 Antenna
10 Housing
11 Transmitter

What is claimed is:

1. A signaling device having a plurality of compatible signal element housings wherein the improvement comprises:

a first sequentially interchangeable signal element module housing (7) with ends electrically and mechanically exchangeable with a second sequentially interchangeable signal element module housing, said first sequentially interchangeable signal module housing (7) having a transmitting unit (8) and/or a receiving unit providing a wireless transfer of data;

a second sequentially interchangeable signal element module housing (2, 3, 4) having ends electrically and mechanically compatible with said first sequentially interchangeable signal element module housing, said second sequentially interchangeable signal element module having a signal element disposed therein wherein said signal element module is selected from the group consisting of:

(a) an optical signal element;
(b) an acoustic signal element; and
(c) an acoustic signal element with an optical signal element; and a receiver wherein the receiver is a land line telephone, a mobile telephone, a radio device and/or an internet link.

2. The signaling device according to claim 1 wherein a wireless data transmission takes place via electromagnetic radiation and/or ultrasound radiation.

3. The signaling device according to claim 1 wherein the transmitting unit (8) and/or the receiver unit is for a public communications network.

4. The signaling device according to claim 1 further comprising a transfer unit wherein said transfer unit is disposed in the transmission path between the transmitting unit (8) and the receiver.

5. The signaling device according to claim 4 wherein several transmitting units (8) are connected with a transfer unit.

6. The signaling device according to claim 1 wherein said receiver receives data via a wireless data transmission path.

7. The signaling device according to claim 1 wherein the transmitting unit (8) includes a mobile radio modem for dialing into a mobile radio network.

8. The signaling device according to claim 1 wherein the transmitting unit (8) is a mobile component for a telephone base station on the land line network.

9. The signaling device according to claim 1 wherein the transmitting unit (8) is a DECT telephone unit or a module operating at a frequency of about 2.4 to 2.5 GHz.

10. The signaling device according to claim 1 wherein the transmitting unit (8) is provided with several transmitters (11) for various transmission channels.

11. The signaling device according to claim 1 further comprising a transmitter (11) wherein the transmitter (11) is in the transmitting unit (8) and is designed to transmit text or symbolic messages.

12. The signaling device according to claim 1 further comprising a transmitter (11) in the transmitting unit (8) for transferring various operating states.

13. The signaling device according to claim 1 further comprising a screen to shield sensitive components of the signaling device from a transmitter (11) in the transmitting unit (8).

14. The signaling device according to claim 1 further comprising an antenna (9) secured to the outside of the first sequentially interchangeable signal element module housing.

15. The signaling device according to claim 1 wherein the transmitting unit (8) of the signal device is located in a machine or a manufacturing plant.

16. The signaling device according to claim 1 wherein the transmitting unit (8) is disposed in a vehicle.

17. A signaling apparatus for machines comprising:

(a) a signal pillar having at least two stackable and sequentially interchangeable segments;

(b) a first stackable and sequentially interchangeable segment of said at least two stackable and sequentially interchangeable segments having an optical signal element, an acoustic signal element or an optical and acoustic signal element, said first stackable and sequentially interchangeable segment of said signal pillar having a first end and a second end;

(c) a second stackable and sequentially interchangeable segment of said at least two stackable and sequentially interchangeable segments wherein said second stackable and sequentially interchangeable segment is a second segment similar to said first stackable and sequentially interchangeable segment by having a first end and a second end mechanically interchangeable with said first end and said second end of said first stackable and sequentially interchangeable segment and said second stackable and sequentially interchangeable segment has a transmitting unit electrically compatible with said first end and said second end of said first stackable and sequentially interchangeable segment; and (d) a receiver and a transfer unit wherein said transfer unit is disposed in the transmission path between the transmitting unit and the receiver and wherein several transmitting units are connected with said transfer unit.

18. A signaling device for machines comprising:

(a) a signal pillar having at least two segments interchangeable without regard to sequence;

(b) a first sequentially interchangeable segment having a signal element, said first sequentially interchangeable segment of said signal pillar having a first end and a second end;

(c) a second sequentially interchangeable segment of said at least two segments, said second sequentially interchangeable segment having a first end mechanically interchangeable with said first end of said first sequentially interchangeable segment and a second end mechanically interchangeable with said second end of said first sequentially interchangeable segment and a transmitting unit electrically compatible with both said first end and said second end of said first sequentially interchangeable segment; and (d) a receiver and a transfer unit wherein the receiver is a land line telephone, a mobile telephone, a radio device and/or an internet link.

19. The signaling device of claim 18 wherein said signal element in said first signal element is an optical signal element, an acoustic signal element or an optical and acoustic signal element.

* * * * *